# 2,799,685
Patented July 16, 1957

2,799,685

UNSATURATED POLYCYCLIC SULFITES AND A PROCESS FOR THEIR MANUFACTURE

Heinz Frensch, Helmut Goebel, Wilhelm Staudermann, and Walter Finkenbrink, Frankfurt am Main, Germany, assignors to Farbwerke Hoechst Aktiengesellschaft vormals Meister Lucius & Brüning, Frankfurt am Main, Germany, a corporation of the Federal Republic of Germany No Drawing. Application April 8, 1955,
Serial No. 500,264

Claims priority, application Germany April 17, 1954

9 Claims. (Cl. 260—327)

The present invention provides new unsaturated polycyclic sulfites corresponding to the following general formula:

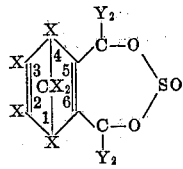

and their derivatives containing two hydrogen atoms in 5.6-position, in which X represents hydrogen, halogen or alkyl and Y represents hydrogen or alkyl.

The new compounds can be obtained by reacting diols of the general formula:

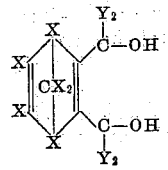

or their derivatives containing two hydrogen atoms in 5.6-position, in which X and Y have the meanings given above, with thionylchloride, if desired in the presence of an indifferent solvent. Chlorine derivatives of the unsaturated diols are preferably used for this purpose.

As indifferent solvents there are suitably used, for example, $CH_2Cl_2$, $CHCl_3$ or $CCl_4$, benzene, toluene, xylene and petroleum ether. The reaction may be performed while cooling or at a raised temperature with or without the addition of an agent capable of binding hydrochloric acid.

The diols required for the reaction can be obtained by reacting an ester of an unsaturated dialcohol with a halogenated diene of the cyclopentadiene type, preferably hexachlorocyclopentadiene, at a raised temperature and, if desired, with application of pressure; the addition product so obtained is then transformed into the corresponding free alcohol, for example, by re-esterification in an alcoholic solution in the presence of a substance serving as a catalyst, for example, a mineral acid. The Diels-Aldersynthesis may be performed by using a solvent, for example, benzene and its homologues or the corresponding chlorine- and nitro-derivatives of chlorinated hydrocarbons, for example, methylene chloride, chloroform or carbon tetrachloride, or alcohol, ether or ketones.

Thus, for example, hexachlorobicyclo-[2:2:1]-heptene-(2)-bis-hydroxymethylene-(5:6) can be treated with thionyl chloride to obtain the sulfite of hexachlorobicyclo-[2:2:1]-heptene-(2)-bis-hydroxymethylene-(5:6) in the form of a mixture of isomers from which the pure isomers melting at 108°–110° C. and 208°–210° C. can be isolated from a solution in petroleum ether by fractional crystallization.

The homologues, i. e. for example the pentachloro- and tetrachloro-derivatives and the corresponding analogues of methyl and ethyl can be obtained in a corresponding manner.

As Diels-Alder-components suitable for the manufacture of sulfites of the kind described above, there come also into consideration the halogenated alkyl derivatives, for example, dimethylcyclopentadiene.

The polycyclic halogenated sulfites are readily crystallizing colorless compounds.

The products of this invention may be used for protecting wood, paper, textiles and leather and as intermediates for the manufacture of drugs. In the pure state, they are practically odourless and are, therefore, especially suitable for the mentioned purposes. They have a curative and prophylactic effect and are preferably used, if desired in admixture with other insecticides, ovicides, fungicides, herbicides or fertilizers, for combating animal and fungoid pests.

In addition to their excellent action as pesticides the substances hereinbefore described are distinguished by their chemical stability.

The products of this invention have a lethal action on insects of the various classes and kinds in every state of development, for example, on imagines, larvae and eggs of, for example, beetles, butterflies, flies, grasshoppers, cockroaches, bugs and lice of plants and animals. The most important fields of application of the products of this invention are plant protection, stock protection and the so-called hygienic pest-control.

A spraying preparation composed of 20 percent of hexachlorobicyclo - [2:2:1] - heptene - (2)-bis-hydroxymethylene-(5:6)-sulfite, 70 percent of dipentene and 10 percent of oxyethylated alkyl phenol can successfully be used for combating fungoid pests, especially genuine mildew. A preparation of 0.5 percent strength timely sprayed on the plants completely avoids the attack of the mildew on plants.

The lethal action of a preparation of the above constitution on diphterene larvae can be demonstrated in the following manner:

Hexachlorobicyclo - [2:2:1]-heptene-(2)-bis-hydroxymethylene-(5:6)-sulfite is intimately mixed with cottage cheese and young larvae of domestic flies (*Musca domestica*) are then placed on the poisoned food. A toxicity of, for example, 0.0125 percent suffices already to kill all the larvae within 1 to 3 days.

Common bed-bugs (*Cimex lectularius*) are killed within a few hours when sprayed with an aqueous emulsion of 0.01 percent strength of a preparation composed of 15 percent of hexachloro-bicyclo-[2:2:1]-heptene-(2)-bis-hydroxymethylene-(5:6)-sulfite, 75 percent of dioxane and 10 percent of oxyethylated alkyl phenol as emulsifier.

An emulsion of 0.05 percent strength of a spraying preparation composed of 15 percent of hexachlorobicyclo-[2:2:1] - heptene - (2) - bis - hydroxymethylene - (5:6) - sulfite, 75 percent of cyclohexanone and 10 percent of oxyethylated alkyl phenol when sprayed or dusted has a rapid action on caterpillars, for example, of the brown tail moth (*Euproctis chrysorrhoea*). They are rapidly seriously injured and die after 1–2 days.

An emulsifiable spraying preparation composed of 15 percent of hexachlorobicyclo-[2:2:1]-heptene-(2)-bis-hydroxymethylene-(5:6)-sulfite, 75 percent of dioxane and 10 percent of oxyethylated alkyl phenol when applied in a concentration of 0.015 percent, brings about the complete destruction of aphids (Aphidae), for example, on Cinerariae or Chrysanthemums.

An emulsifiable spraying preparation composed of 15 percent of hexachlorobicyclo-[2:2:1]-heptene-(2)-bis-hydroxymethylene-(5:6)-sulfite, 75 percent of dioxane and 10 percent of oxyethylated alkyl phenol is useful for the destruction of caterpillars, for example, *Limantria dispar.*

When this spraying preparation is applied in the form of an aqueous emulsion of 0.1 percent strength, the insects that come in contact with the sprayed emulsion are rapidly paralyzed and die within a few hours.

Migratory locusts are killed when sprayed with an emulsion of 0.1 percent strength of a preparation composed of 15 percent of hexachlorobicyclo-[2:2:1]-heptene-(2)-bis-hydroxymethylene-(5:6)-sulfite, 75 percent of dioxane and 10 percent of a wetting agent as emulsifier.

The substances may be used in the form of a dust or a spray and may be used in admixture with a substance, for example, a diluent or a solvent, a wetting, emulsifying or adhering agent.

A wettable powder composed of 25 percent of hexachlorobicyclo - [2:2:1] - heptadiene - (2:5) - bis - hydroxyethylene - (5:6) - sulfite, 10 percent of cell pitch, 0.25 percent of oxyethylated alkyl phenol and 64.75 percent of chalk, when sprayed on apple trees in a concentration of 0.1 percent has a prophylactic action against the caterpillars of the brown tail moth (*Euproctis chrysorrhoea*) and other kinds of caterpillars leaving the window-nest by killing them before considerable devouring damage on the trees occurs.

A dusting preparation composed of 1 percent of hexachlorobicyclo - [2:2:1] - heptadiene - (2:5) - bis - hydroxyethylene - (5:6) - sulfite and 99 percent of talc, when applied to corn in a proportion of 1 kilogram to 1000 kilograms of corn, is very useful for combating grain weevils and other stock pests.

An emulsifying product containing 15 percent of hexachlorobicyclo-[2:2:1] - heptadiene - (2:5) - bis - hydroxyethylene - (5:6) - sulfite, when sprayed on cinerariae in a concentration of 0.1 to 0.05 percent, has a rapid and lethal action on sucking pests, for example, green aphids.

The following examples serve to illustrate the invention but they are not intended to limit it thereto.

EXAMPLE 1

*Hexachlorobicyclo - [2:2:1] - heptadiene - (2:5) - bis - hydroxyethylene - (5:6) - sulfite*

77.2 grams of hexachlorobicyclo-[2:2:1]-heptadiene-(2:5)-bis-hydroxyethylene-(5:6) are mixed in the cold with an excess of thionylchloride. A vigorous reaction sets in and is completed by heating on the steam bath. The thionylchloride in excess is destroyed by pouring it into water and the resulting sulfite which solidifies after some time is isolated by filtering with suction. The reaction product obtained in the form of a mixture of isomers melts at 93°–95° C.

*Analysis.*—Calculated for $C_{11}H_8O_3Cl_6S$: O: 11.05; S: 7.39. Found: molecular weight: 432.9; O: 10.73; S: 7.29.

EXAMPLE 2

*Hexachlorobicyclo - [2:2:1] - heptene - (2) - bis - hydroxyethylene - (5:6) - sulfite*

71.6 grams of hexachlorobicyclo-[2:2:1]-heptene-(2)-bis-hydroxymethylene-(5:6) are treated with an excess of thionyl chloride. In order to complete the reaction, it is advisable to reflux the reaction mixture for about 1 to 2 hours. When the evolution of hydrochloric acid is complete, the thionyl chloride in excess is destroyed by pouring it into water and the sulfite so obtained, which solidifies after some time, is isolated by filtering with suction. The reaction product so obtained can be purified by distillation under highly reduced pressure (boiling point: 164°–168° C. under a pressure of 0.7 mm. of mercury; the product so purified has a melting range from between about 90°–100° C.

The product so obtained is a mixture of isomers and substantially contains 2 isomers boiling at 108°–110° C. and 208°–210° C. The isomers may be separated from one another by fractional crystallization from a solution in petroleum ether.

*Analysis.*—Calculated for $C_9H_6O_3Cl_6S$: C: 26.56; H: 1.48; O: 11.80; Cl: 52.28; S: 7.88; molecular weight: 406.92. Found: C: 26.36; H: 1.28; O: 11.74; Cl: 52.46; S: 7.84.

The analytical values found correspond in both cases to the theoretical values; the molecular weight determination likewise shows no differences.

EXAMPLE 3

*Hexachlorobicyclo - [2:2:1] - heptene - (2) - bis - hydroxyethylene - (5:6) - sulfite*

71.6 grams of finely powdered hexachlorobicyclo-[2:2:1]-heptene-(2)-bis-hydroxymethylene-(5:6) are suspended in 300 grams of carbon tetrachloride and the calculated amount of thionyl chloride is added at room temperature, while stirring. To accelerate the reaction, the reaction mixture is gradually heated to the boiling temperature of the solvent. When the evolution of hydrochloric acid is complete, the solution is cooled, stirred with water and subsequently treated with an aqueous solution of sodium bicarbonate until the reaction solution is neutral.

After drying and distillation of the solvent, the reaction product is obtained in the form of a fused mass which soon solidifies. It is then worked up as described in Example 2.

EXAMPLE 4

*Pentachlorobicyclo-[2:2:1]-heptene-(2)-bis-hydroxymethylene-(5:6)-sulfite*

According to the process described in Example 2, the calculated amount of pentachlorobicyclo - [2:2:1] - heptene-(2)-bis-hydroxymethylene-(5:6) (obtained from pentachlorobicyclo - [2:2:1] - heptence-(2)-bis-acetoxymethylene-(5:6) boiling at 196°–198° C. under a pressure of 2.2 mm. of mercury by re-esterification in alcohol) is treated with thionyl chloride. The product so obtained boils at 180°–181° C. under a pressure of 2.6 mm. of mercury.

Calculated for $C_9H_7O_3Cl_5S$: molecular weight: 372.49; Cl: 47,59; S: 8.61. Found Cl: 47.75 and 47.81; S: 8.43 and 8.32.

EXAMPLE 5

Tetrachlorobicyclo - [2:2:1] - heptene-(2)-bis-hydroxymethylene-(5:6) (obtainable from tetrachlorobicyclo-[2:2:1]-heptene - (2) - bis-acetoxymethylene-(5:6) boiling at 185°–188° C. under a pressure of 2.2 mm. of mercury) is reacted with thionyl chloride. Tetrachlorobicyclo-[2:2:1] - heptene - (2) - bis - hydroxymethylene-(5:6)-sulfite is obtained. Boiling point: 170°–172° C. under a pressure of 3.0 mm. of mercury.

We claim:

1. A member of the group consisting of compounds of the general formula:

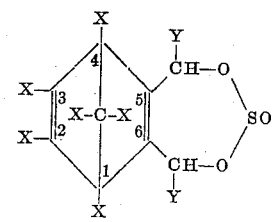

in which X represents a member of the group consisting of hydrogen and chlorine, at least 4 chlorine atoms being present, and Y represents a member of the group consisting of hydrogen and methyl and their derivatives containing two hydrogen atoms in 5,6-position.

2. Hexachlorobicyclo - [2:2:1] - heptadiene-(2:5)-bishydroxyethylene-(5:6)-sulfite having the structural formula:

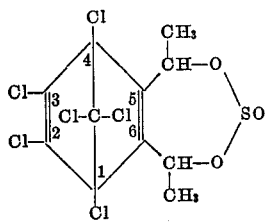

in the form of a mixture of isomers.

3. Hexachlorobicyclo - [2:2:1] - heptene - (2) - bis - hydroxymethylene-(5:6)-sulfite in the form of a mixture of isomers.

4. Hexachlorobicyclo - [2:2:1] - heptene - (2)-bis-hydroxymethylene-(5:6)-sulfite melting at 108°–110° C.

5. Hexachlorobicyclo - [2:2:1] - heptene - (2) - bis - hydroxymethylene-(5:6) - sulfite melting at 208°–210° C.

6. A process for the manufacture of new compounds defined according to claim 1, wherein a member of the group consisting of diols of the general formula:

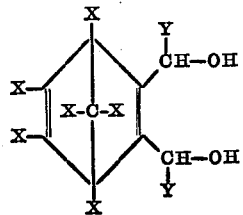

in which X represents a member of the group consisting of hydrogen and chlorine, at least 4 chlorine atoms being present, and Y represents a member of the group consisting of hydrogen and methyl and their derivatives containing two hydrogen atoms in 5,6-position, are reacted with thionyl chloride.

7. A process as claimed in claim 6, wherein the reaction is carried out while heating.

8. A process as claimed in claim 6, wherein chlorinated unsaturated diols are used as starting material.

9. A process as claimed in claim 6, wherein the reaction is carried out in the presence of an inert solvent.

References Cited in the file of this patent

UNITED STATES PATENTS

| | | |
|---|---|---|
| 2,465,915 | Myles | Mar. 29, 1949 |
| 2,708,198 | Pietsch | May 10, 1955 |
| 2,708,200 | Pietsch | May 10, 1955 |